United States Patent
Dong et al.

(10) Patent No.: US 12,123,063 B2
(45) Date of Patent: Oct. 22, 2024

(54) CONVERTER BOTTOM BLOWING SYSTEM CAPABLE OF ALLOWING MULTIPLE MEDIA TO SHARE BOTTOM BLOWING LANCES AND METHOD FOR USING SAME

(71) Applicants: University of Science and Technology Beijing, Beijing (CN); Beijing Kemi Rongcheng Energy Technology Co., Ltd., Beijing (CN)

(72) Inventors: Kai Dong, Beijing (CN); Xin Ren, Beijing (CN); Rong Zhu, Beijing (CN); Guangsheng Wei, Beijing (CN); Chao Feng, Beijing (CN); Rongfang Su, Beijing (CN); Shaoyan Hu, Beijing (CN); Yun Zhou, Beijing (CN); Chunyang Wang, Beijing (CN); Zhitao Xue, Beijing (CN); Linghui Meng, Beijing (CN)

(73) Assignees: University of Science and Technology Beijing, Beijing (CN); Beijing Kemi Rongcheng Energy Technology Co., Ltd., Beijing (CN)

( * ) Notice: Subject to any disclaimer, the term of this patent is extended or adjusted under 35 U.S.C. 154(b) by 0 days.

(21) Appl. No.: 18/458,173

(22) Filed: Aug. 30, 2023

(65) Prior Publication Data
US 2024/0247328 A1    Jul. 25, 2024

(30) Foreign Application Priority Data
Jan. 20, 2023 (CN) .......................... 202310062337.4

(51) Int. Cl.
 *C21C 5/30* (2006.01)
 *C21C 5/46* (2006.01)
 *C21C 7/064* (2006.01)

(52) U.S. Cl.
 CPC .............. *C21C 5/30* (2013.01); *C21C 5/4606* (2013.01); *C21C 5/466* (2013.01); *C21C 7/0645* (2013.01); *C21C 2005/4666* (2013.01)

(58) Field of Classification Search
 CPC ......... C21C 5/30; C21C 5/4606; C21C 5/466; C21C 7/0645; C21C 2005/4666
 See application file for complete search history.

(56) References Cited

U.S. PATENT DOCUMENTS 6,017,380 A * 1/2000 Kitamura .................. C21C 5/32
                                                     75/553
6,558,614 B1 * 5/2003 Fritz ...................... F23D 17/002
                                                     266/225

(Continued)

FOREIGN PATENT DOCUMENTS

FR              2448572 A1      9/1980
FR              2448572 A   * 10/1980    ............. C21C 5/005
WO   WO-2021239161 A1  * 12/2021    ............... C21C 5/34

OTHER PUBLICATIONS

Setiawan, Hendrik, Mio Sakamoto, and Yusuke Shiratori. "Study on biochar as desulfurizer for SOFC application." Fuel Cells 21.5 (2021): 430-439. (Year: 2021).*

*Primary Examiner* — Keith D. Hendricks
*Assistant Examiner* — Moriah S. Smoot
(74) *Attorney, Agent, or Firm* — True Shepherd LLC; Andrew C. Cheng

(57) ABSTRACT

A converter bottom blowing system comprises a first gas source connected in parallel with a lime powder silo, a lime powder blowing tank and a first injector, where a first cut-off valve is arranged between the lime powder blowing tank and the first injector; a second gas source connected in parallel with the biochar powder silo, the biochar powder blowing tank and the second injector, where a second cut-off valve is arranged between the biochar powder blowing tank and the (Continued)

second injector; a converter, where a plurality of bottom blowing lances are arrayed at a bottom of a converter, the bottom blowing lances are connected with the first injector and the second injector through a three-way valve, a third cut-off valve is arranged between the first injector and the three-way valve, and a fourth cut-off valve is arranged between the second injector and the three-way valve.

8 Claims, 1 Drawing Sheet

(56) References Cited

U.S. PATENT DOCUMENTS

| | | |
|---|---|---|
| 6,687,339 B2 | 2/2004 | Martin |
| 8,435,738 B2 | 5/2013 | Holmes |
| 10,371,710 B2 | 8/2019 | Wasson et al. |

* cited by examiner

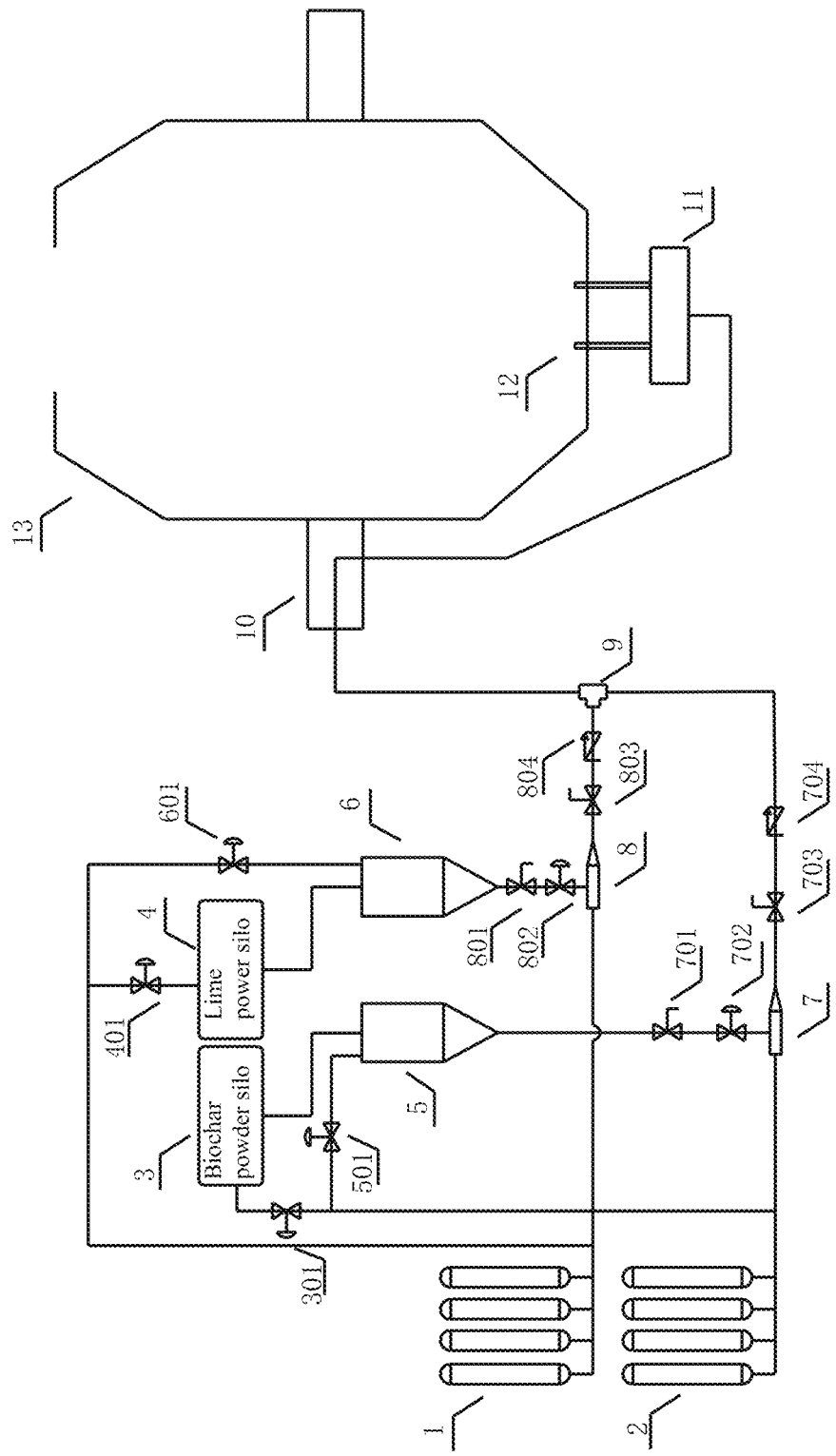

CONVERTER BOTTOM BLOWING SYSTEM CAPABLE OF ALLOWING MULTIPLE MEDIA TO SHARE BOTTOM BLOWING LANCES AND METHOD FOR USING SAME

CROSS-REFERENCE TO RELATED APPLICATIONS

This application claims priority to Chinese Patent Application No. 202310062337.4 with a filing date of Jan. 20, 2023. The content of the aforementioned application, including any intervening amendments thereto, is incorporated herein by reference.

TECHNICAL FIELD

The present disclosure relates to the technical field of converter steelmaking, in particular to a converter bottom blowing system capable of allowing multiple media to share bottom blowing lances and a method for using the same.

BACKGROUND

Traditional converter steelmaking uses molten iron as the main raw material and a small amount of steel scrap. Due to insufficient heat, the proportion of steel scrap is usually less than 20%. For converter steelmaking, an increase of the proportion of steel scrap can reduce $CO_2$ emissions. For every 10% increase in the proportion of steel scrap in converter steelmaking (that is, a 10% decrease in the proportion of molten iron), the total $CO_2$ emissions for smelting one ton of steel can be reduced by about 6%. In order to increase the scrap ratio of the converter, biochar powder blowing through converter bottom is proposed. As a zero-carbon energy source, biomass has similar calorific value, lower sulfur and hydrogen content, and better combustion reactivity, and is one of the important choices for blowing carbon powder at the converter bottom in a dual-carbon background.

The technology of oxygen-lime powder blowing from the bottom of the converter in recent years has changed the traditional way of adding metallurgical materials into the furnace in a form of "lump" and "batch materials". The lime powder made into powder or fine particles, and oxygen used as the carrier gas continuously sprayed into the deep part of the molten pool. Because the powder is directly sprayed into the molten pool, the contact area between the lime powder and the molten metal is significantly enlarged, and the local concentration of the powder is increased. Simultaneously, the mass transfer process is accelerated due to the agitation of the gas, thereby greatly improving the kinetic conditions of the reaction in the molten pool increasing the reaction speed.

In the steelmaking technology of the biochar powder and lime powder blowing at the bottom of the converter the prior art, the biochar powder is blown at the bottom in the early stage of converter smelting, and temperature is increased rapidly to improve carbonization. In the middle and late stages of smelting, lime powder is blown at the bottom, and dephosphorization and desulfurization are quickly and efficiently completed. However, in order to prevent explosion, biochar powder usually uses nitrogen as the carrier gas. While dephosphorization and desulfurization require high oxygen potential conditions, lime powder blowing at the bottom usually uses oxygen as the carrier gas. Therefore, due to the difference in the carrier gas, in order to prevent the mixing between oxygen and biochar powder, converter bottom blowing nitrogen-biochar powder and oxygen-lime powder usually use separate routing pipes and bottom blowing lances.

In the prior art, on the one hand, due to the use of two separate bottom blowing systems, it is very difficult to make arrangement in the furnace bottom space which is small and limited. On the other hand, the increasing number of the bottom blowing due to the use of two separate bottom blowing systems will increase the risk of blockage of the bottom blowing lance, which will affect the overall operation stability of the bottom blowing powder system and increase the difficulty to control the powder spraying system. Too many bottom blowing lances will also affect the overall structure of the converter to a certain extent, bringing certain safety hazards.

SUMMARY

In order to solve the technical problems of the bottom blown biochar powder and lime powder steelmaking process in the prior art, such as the construction difficulty of the furnace bottom, and the large number of bottom blowing lances increasing the blockage risk, the embodiments of the present disclosure provide a converter bottom blowing system capable of allowing multiple media to share bottom blowing lances and a method for using the same, the converter bottom blowing system includes a first gas source,
  where the first gas source is connected in parallel with a lime powder silo, a lime powder blowing tank and a first injector, the lime powder silo is connected with the lime powder blowing tank; the lime powder blowing tank is connected with the first injector; and
  a lime powder silo stamping valve is provided between the first gas source and the lime powder silo, and a lime powder blowing tank stamping valve is provided between the first gas source and the lime powder blowing tank; a first cut-off valve is provided between the lime powder blowing tank and the first injector;
a second gas source,
  where the second gas source is connected in parallel with a biochar powder silo, a biochar powder blowing tank and a second injector, and the biochar powder silo is connected with the biochar powder blowing tank; the biochar powder blowing tank is connected with the second injector; and
  a biochar powder silo stamping valve is provided between the second gas source and the biochar powder silo, and a biochar powder blowing tank stamping valve is provided between the second gas source and the biochar powder blowing tank; a second cut-off valve is provided between the biochar powder blowing tank and the second injector; and
a converter,
  where a plurality of bottom blowing lances are arrayed at a bottom of a converter, and the bottom blowing lances are connected with the first injector and the second injector through a three-way valve, and
  a third cut-off valve is provided between the first injector and the three-way valve, and a fourth cut-off valve is provided between the second injector and the three-way valve.

In an optional embodiment, a first regulating valve is also provided between the first injector and the first cut-off valve; and
  a second regulating valve is also provided between the second injector and the second cut-off valve.

In an optional embodiment, a first powder one-way valve is also provided between the three-way valve and the third cut-off valve; and a second powder one-way valve is also provided between the three-way valve and the fourth cut-off valve.

In an optional embodiment, the plurality of bottom blowing lances are arrayed at the bottom of the converter through a distributor, and the distributor is connected with the three-way valve through a rotary joint.

Another embodiment of the present disclosure provides a method of using a converter bottom blowing system capable of allowing multiple media to share bottom blowing lances, the method comprising:

S1, air blowing to an empty furnace, including:
opening the fourth cut-off valve, closing the first cut-off valve, the first regulating valve, the second cut-off valve, the second regulating valve and the third cut-off valve, and blowing nitrogen to the bottom blowing lances at a bottom of a converter from the second gas source;

S2, charging melted iron, including:
while adding steel scrap and molten iron to the converter, opening a biochar powder blowing tank stamping valve and a lime powder blowing tank stamping valve, pressurizing a lime powder blowing tank to 1.3 MPa to 1.5 MPa by means of a first gas source, and pressurizing a biochar powder blowing tank to 1.3 MPa to 1.5 MPa by means of the second gas source;

S3, biochar powder blowing, including:
after the steel scrap and the molten iron are added to the converter, opening the biochar powder silo stamping valve, the second cut-off valve and the second regulating valve, and blowing biochar powder and nitrogen simultaneously from the second gas source to the bottom blowing lances at the bottom of the converter;

S4, switching from biochar powder blowing to lime powder blowing, including
when the steel scrap is completely melted, stopping the biochar powder blowing, and switching to the lime powder blowing, wherein S4 specifically includes:

S41, closing the second cut-off valve and the second regulating valve in sequence, and stopping the biochar powder blowing; continuing blowing nitrogen to the bottom blowing lances at the bottom of the converter by means of the second gas source continues;

S42, opening the third cut-off valve, blowing oxygen from the first gas source to the bottom blowing lances at the bottom of the converter, and simultaneously controlling a flow rate of the nitrogen blown from the second gas source to the bottom blowing lances at the bottom of the converter to gradually decrease, when the nitrogen blowing from the second gas source to the bottom blowing lances at the bottom of the converter is completed, and the oxygen blowing from the first gas source to the bottom blowing lances at the bottom of the converter is switched, closing the fourth cut-off valve;

S43, opening the lime powder silo stamping valve, the first cut-off valve and the first regulating valve, and simultaneously blowing lime powder and oxygen from the first gas source to the bottom blowing lances at the bottom of the converter; and S5, air blowing, including:
in a later stage of smelting in the converter, closing the first cut-off valve and the first regulating valve, stopping the first gas source from blowing the lime powder to the bottom blowing lances at the bottom of the converter, and continuing blowing oxygen from the first gas source to the bottom blowing lances at the bottom of the converter.

In an optional embodiment, in step S1, during the second gas source blowing nitrogen to the bottom blowing lances at the bottom of the converter, a flow rate of each of the bottom blowing lances is 300 Nm$^3$/h to 500 Nm$^3$/h.

In an optional embodiment, during iron adding, the second gas source blows nitrogen to the bottom blowing lances at the bottom of the converter, and a flow rate of each of the bottom blowing lances is increased to 1000 Nm$^3$/h to 1200 Nm$^3$/h.

In an optional embodiment, during the biochar powder blowing in step S3, an opening degree of the second regulating valve is adjusted according to a flow rate of the biochar powder.

In an optional embodiment, in step S42, a flow rate of the oxygen from the first gas source to the bottom blowing lances at the bottom of the converter is controlled to gradually increase, while a flow rate of nitrogen from the second gas source to the bottom blowing lances at the bottom of the converter is controlled to gradually reduce, so that a total flow rate of the oxygen and the nitrogen in a single bottom blowing lance is 1000 Nm$^3$/h to 1200 Nm$^3$/h.

In an optional embodiment, in step S43, while the lime powder and the oxygen are blown from the first gas source to the bottom blowing lances at the bottom of the converter, an opening degree of the first regulating valve is adjusted according to the flow rate of lime powder.

The beneficial effects brought by the technical solutions provided by the embodiments of the present disclosure at least include:

a converter bottom blowing system capable of allowing multiple media to share bottom blowing lances and a method for using the same are proposed by this disclosure. By upgrading the converter bottom blowing system and optimizing and improving the method for using the converter bottom blowing system upgraded, the biochar powder and lime powder share the same pipe and are sprayed into the converter through a common bottom blowing lance, which can greatly reduce the number of bottom blowing lances, effectively reduce the risk of blockage caused by too many bottom blowing lances and the impact on the overall structural strength of the converter, improve the stability of the operation of the converter bottom blowing system, and prolong the overall life of the converter bottom blowing system.

BRIEF DESCRIPTION OF THE DRAWINGS

In order to more clearly illustrate the technical solutions in the embodiments of the present disclosure, the drawings that need to be used in the description of the embodiments will be briefly introduced below. Obviously, the drawings in the following description are only some embodiments of the present disclosure. For those skilled in the art, other drawings can also be obtained based on these drawings without creative effort.

FIG. 1 is a structural schematic diagram of a converter bottom blowing system capable of allowing multiple media to share bottom blowing lances according to the present disclosure.

DETAILED DESCRIPTION OF EMBODIMENTS

The following will clearly and completely describe the technical solutions in the embodiments of the present disclosure with reference to the accompany drawings in the embodiments of the present disclosure. Obviously, the described embodiments are only some, not all, embodiments of the present disclosure. Based on the embodiments of the present disclosure, all other embodiments obtained by persons of ordinary skill in the art without making creative efforts belong to the protection scope of the present disclosure.

The terms "first", "second", "third", "fourth", etc. (if any) in the description and claims of the present disclosure and the above drawings are used to distinguish similar objects and not necessarily describe a specific order or sequence. It is to be understood that the data used are interchangeable under appropriate circumstances such that the embodiments of the present disclosure described herein are, for example, capable of practice in sequences other than those illustrated or described herein. Furthermore, the terms "comprising" and "having", as well as any variations thereof, are intended to cover a non-exclusive inclusion, for example, a process, method, system, product or device comprising a sequence of steps or elements is not necessarily limited to the expressly listed instead, may include other steps or elements not explicitly listed or inherent to the process, method, product or apparatus.

In the schematic structural diagram of a converter bottom blowing system of a multi-media shared bottom blowing lance of the present disclosure as shown in FIG. 1, a converter bottom blowing system capable of allowing multiple media to share bottom blowing lances is provided according to an embodiment of the present disclosure. The converter bottom blowing system includes a first gas source 1, a second gas source 2, a biochar powder silo 3, a lime powder silo 4, a biochar powder blowing tank 5, a lime powder blowing tank 6, a first injector 8, a second injector 7, a three-way valve 9, a rotary joint 10, a distributor 11 and a converter 13. A plurality of bottom blowing lances 12 are arrayed at a bottom of a converter 13, specifically, the bottom blowing lances 12 are arrayed at the bottom of the converter 13 through the distributor 11, and the distributor 11 is connected with the three-way valve 9 through the rotary joint 10.

According to an embodiment of the present disclosure, the first gas source 1 is connected in parallel with the lime powder silo 4, the lime powder blowing tank 6 and the first injector 8. The lime powder silo 4 is connected with the lime powder blowing tank 6, and the lime powder blowing tank 6 is connected with the first injector 8.

In some embodiments, the lime powder silo 4 is stored with lime powder or lime powderstone, or both lime powder and lime powderstone.

According to an embodiment of the present disclosure, a lime powder silo stamping valve 401 is provided between the first gas source 1 and the lime powder silo 4, and a lime powder blowing tank stamping valve 601 is provided between the first gas source 1 and the lime powder blowing tank 6. A first cut-off valve 801 is provided between the lime powder blowing tank 6 and the first injector 8, and a first regulating valve 802 is provided between the first injector 8 and the first cut-off valve 801.

According to an embodiment of the present disclosure, the second gas source 2 is connected in parallel with a biochar powder silo 3, the biochar powder blowing tank 5 and the second injector 7, and the biochar powder silo 3 is connected with the biochar powder blowing tank 5. The biochar powder blowing tank 5 is connected with the second injector 7.

In some embodiments, the biochar powder silo 3 is stored with one or more of biochar powder, coal powder or rubber particles.

According to an embodiment of the present disclosure, a biochar powder silo stamping valve 301 is provided between the second gas source 2 and the biochar powder silo 3, and a biochar powder blowing tank stamping valve 501 is provided between the second gas source 2 and the biochar powder blowing tank 5. A second cut-off valve 701 is provided between the biochar powder blowing tank 5 and the second injector 7, and a second regulating valve 702 is provided between the second injector 7 and the second cut-off valve 701.

According to an embodiment of the present disclosure, the bottom of the converter 13 is connected with a plurality of bottom blowing lances 12 through a distributor 11, and the distributor 11 is connected with the three-way valve 9 through a rotary joint 10, so that the bottom blowing lance 12 is connected with the first injector 8 and the second injector 7 through the three-way valve 9.

In a specific embodiment, the bottom blowing lances 12 are arrayed on the distributor 11 and vertically installed on the furnace base of the converter 13. In some embodiments, the number of bottom blowing lances 12 is selected from 2 to 8 according to the nominal capacity of the converter 13.

In some embodiments, a converter bottom blowing system capable of allowing multiple media to share bottom blowing lances of the present disclosure is applied to a 300-ton converter with 8 bottom blowing lances 12, in which 4 are arranged on both sides of the middle line of the bottom trunnion of the converter 13. The material of the bottom blowing lance 12 is made of stainless steel, the central tube diameter is 24 mm, and the inner and outer ring seams are 2 mm wide.

According to an embodiment of the present disclosure, a third cut-off valve 803 is provided between the first injector 8 and the three-way valve 9, and a first powder one-way valve 804 is provided between the three-way valve 9 and the third cut-off valve 803, so as to prevent mixing of oxygen with biochar powder.

A fourth cut-off valve 703 is provided between the second injector 7 and the three-way valve 9, and a second powder one-way valve 704 is provided between the three-way valve 9 and the fourth cut-off valve 703, so as to prevent mixing of nitrogen with lime powder.

The biochar powder of the present disclosure is sprayed from the second injector 7 to the three-way valve 9, and sprayed to the converter 13 through the rotary joint 10, the distributor 11 and the bottom blowing lance 12 at the bottom of the converter 13.

Lime powder is sprayed from the first injector 8 to the three-way valve 9, and sprayed to the converter 13 through the rotary joint 10, the distributor 11 and the bottom blowing lance 12 at the bottom of the converter 13.

The biochar powder and lime powder of the present disclosure share a pipe through the three-way valve 9, and are sprayed to the converter 13 through the rotary joint 10, the distributor 11 and the bottom blowing lance 12 at the bottom of the converter 13, which can effectively reduce the construction difficulty of the furnace bottom, and the number of the bottom blowing lances 12. The specific biochar powder and lime powder blowing process of the present disclosure will be described in detail below.

The present disclosure provides a method for using a converter bottom blowing system capable of allowing multiple media to share bottom blowing lances. In the embodiment, a converter bottom blowing system capable of allowing multiple media to share bottom blowing lances is applied to a 300-ton converter as an example for illustration. In the process of converter smelting, after the steel scrap and the molten iron are added, the bottom blown biochar powder is firstly used for rapid heat supplementation, carbonization and melting. The biochar powder blowing at the bottom is switched online to the lime powder blowing after more than 80% of the steel scrap is melt, to quickly complete the removal of impurity elements such as phosphorus and sulfur.

In conjunction with FIG. 1, according to an embodiment of the present disclosure, a method for using a converter bottom blowing system capable of allowing multiple media to share bottom blowing lances includes the following method steps:

Step S1, air blowing to an empty furnace (empty furnace mode).

After the slag dumping of the previous furnace is completed, the empty furnace mode is used. In order to prevent the bottom blowing lance 12 from being blocked, the fourth cut-off valve 703 is opened, and the first cut-off valve 801, the first regulating valve 802, the second cut-off valve 701, and the third cut-off valve 803 are closed. Nitrogen gas is blown from the second gas source 2 to the bottom blowing lances 12 at the bottom of the converter 13.

During the nitrogen blowing from the second gas source 2 to the bottom blowing lances 12 at the bottom of the converter 13, the nitrogen flow rate of a single bottom blowing lance 12 is controlled to be 300 $Nm^3/h$ to 500 $Nm^3/h$.

In one embodiment, the nitrogen flow rate of a single bottom blowing lance 12 is controlled to be 400 $Nm^3/h$.

Step S2, charging melted iron (iron adding mode).

While the converter 13 is added with steel scrap and molten iron, the biochar powder blowing tank stamping valve 501 and the lime powder blowing tank stamping valve 601 are opened, and the lime powder blowing tank 6 is quickly pressurized to 1.3 MPa to 1.5 MPa by means of a first gas source 1, and the biochar powder blowing tank 5 is quickly pressurized to 1.3 MPa to 1.5 MPa by means of the second gas source 2.

In one embodiment, the first gas source 1 quickly pressurizes the lime powder blowing tank 6 to 1.5 MPa, and the second gas source 2 quickly pressurizes the biochar powder blowing tank 5 to 1.5 MPa.

During the iron adding process, the second gas source 2 blows nitrogen gas to the bottom blowing lances 12 at the bottom of the converter 13, and the nitrogen flow rate of a single bottom blowing lance 12 increases to 1000 $Nm^3/h$ to 1200 $Nm^3/h$.

In one embodiment, the nitrogen flow rate of a single bottom blowing lance 12 is increased to 1200 $Nm^3/h$.

Step S3, biochar powder blowing (biochar powder blowing mode).

After the steel scrap and the molten iron are added to the converter 13, biochar powder is blown.

Specifically, the biochar powder silo stamping valve 301, the second cut-off valve 701 and the second regulating valve 702 are opened, and an opening degree of the second regulating valve 702 is adjusted, and biochar powder and nitrogen are blown from the second gas source 2 to the bottom blown lance 12 of the converter 13 simultaneously.

In one embodiment, according to a flow rate of the biochar powder, the valve position of the second regulating valve 702 is adjusted to 50%.

Step S4, switching from the biochar powder blowing to the lime powder blowing (online switching mode).

When the steel scrap is completely melted, the biochar powder blowing is stopped, and switched to the lime powder blowing (online switching), including:

Step S41, the second cut-off valve 701 and the second regulating valve 702 are closed in sequence, and the biochar powder blowing is stopped. The second gas source 2 continues to blow nitrogen gas to the bottom blowing lances 12 at the bottom of the converter 13 for 2 to 3 minutes, to purge the residual biochar powder in the pipeline and distributor 11.

In one embodiment, the second gas source 2 continues to blow nitrogen gas to the bottom blowing lances 12 at the bottom of the converter 13 for 3 minutes.

Step S42, the third cut-off valve 803 is opened, and oxygen is blown from the first gas source 1 to the bottom blowing lances 12 at the bottom of the converter 13, and the flow rate of nitrogen gas blown from the second gas source 2 to the bottom blowing lances 12 at the bottom of the converter 13 is controlled to gradually decrease.

Specifically, the a flow rate of the oxygen blown from the first gas source 1 to the bottom blowing lances 12 at the bottom of the converter 13 is controlled to gradually increase, and the a flow rate of the nitrogen blown from the second gas source 2 to the bottom blowing lances 12 at the bottom of the converter 13 is controlled to gradually decrease, so that the total flow rate of oxygen and nitrogen in a single bottom blowing lance 12 is maintained at 1000 $Nm^3/h$ to 1200 $Nm^3/h$.

In one embodiment, the total flow rate of oxygen and nitrogen of a single bottom blowing lance 12 is maintained at 1200 $Nm^3/h$.

When the nitrogen blown from the second gas source 2 to the bottom blowing lances 12 at the bottom of the converter 13 is completed, and the oxygen blown from the first gas source 1 to the bottom blowing lances 12 at the bottom of the converter 13 is switched, the fourth cut-off valve 703 is closed.

Step S43, the lime powder silo stamping valve 401, the first cut-off valve 801 and the first regulating valve 802 are opened, an opening degree of the first regulating valve 802 is adjusted, and lime powder and oxygen are blown from the first gas source 1 to the bottom blowing lances 12 at the bottom of the converter 13 simultaneously.

In one embodiment, an opening degree of the first regulating valve 802 is adjusted to 40% according to the flow rate of lime powder.

Step S5, air blowing (air blowing mode).

In the later stage of smelting in the converter 13, the first cut-off valve 801 and the first regulating valve 802 are closed, the first gas source 1 stops blowing lime powder to the bottom blowing lances 12 at the bottom of the converter 13, and the first gas source 1 continues to blow oxygen to the bottom blowing lances 12 at the bottom of the converter 13.

The present disclosure proposes a converter bottom blowing system capable of allowing multiple media to share bottom blowing lances and a method for using the same, which is applied to a 300-ton converter, with the number of bottom blowing lances reduced from 16 to 8, and the blowing process being stable and controllable. The clogging frequency of the bottom blowing lance 12 is reduced by 30%, the operation of the bottom blowing system of the converter is stable, and the service life is extended from 1000 furnaces to 1500 furnaces.

Finally, it should be noted that the above embodiments are only used to illustrate the technical solutions of the present disclosure, rather than limiting them. Although the present disclosure has been described in detail with reference to the foregoing embodiments, those of ordinary skill in the art should understand that it is still possible to modify the technical solutions described in the foregoing embodiments, or perform equivalent replacements for some or all of the technical features, and these modifications or replacements do not make the essence of the corresponding technical solutions deviate from the scope of the technical solutions of the various embodiments of the present disclosure.

What is claimed is:

1. A method for using a converter bottom blowing system capable of allowing multiple media to share bottom blowing lances, wherein the converter bottom blowing system comprises:

a first gas source, wherein the first gas source is connected in parallel with a lime powder silo, a lime powder blowing tank and a first injector, the lime powder silo is connected with the lime powder blowing tank; the lime powder blowing tank is connected with the first injector; a lime powder silo stamping valve is provided between the first gas source and the lime powder silo, and a lime powder blowing tank stamping valve is provided between the first gas source and the lime powder blowing tank; and a first cut-off valve is provided between the lime powder blowing tank and the first injector; the first gas source comprises oxygen;

a second gas source, wherein the second gas source is connected in parallel with a biochar powder silo, a biochar powder blowing tank and a second injector, and the biochar powder silo is connected with the biochar powder blowing tank; the biochar powder blowing tank is connected with the second injector; a biochar powder silo stamping valve is provided between the second gas source and the biochar powder silo, and a biochar powder blowing tank stamping valve is provided between the second gas source and the biochar powder blowing tank; and a second cut-off valve is provided between the biochar powder blowing tank and the second injector; the second gas source comprises nitrogen; and a converter, wherein a plurality of bottom blowing lances are arrayed at a bottom of a converter, and the bottom blowing lances are connected with the first injector and the second injector through a three-way valve, and a third cut-off valve is provided between the first injector and the three-way valve, and a fourth cut-off valve is provided between the second injector and the three-way valve; and the method comprises steps of:

S1, air blowing to an empty furnace, which comprises sub-steps of:

opening the fourth cut-off valve, closing the first cut-off valve, the first regulating valve, the second cut-off valve, the second regulating valve and the third cut-off valve, and blowing nitrogen from the second gas source to the bottom blowing lances at the bottom of the converter;

S2, charging melted iron, which comprises sub-steps of:

adding steel scrap and molten iron to the converter, opening the biochar powder blowing tank stamping valve and the lime powder blowing tank stamping valve, pressurizing the lime powder blowing tank to 1.3 MPa to 1.5 MPa by means of the first gas source, and pressurizing the biochar powder blowing tank to 1.3 MPa to 1.5 MPa by means of the second gas source;

S3, biochar powder blowing, which comprises sub-steps of:

after the steel scrap and the molten iron are added to the converter, opening the biochar powder silo stamping valve, the second cut-off valve and the second regulating valve, and blowing biochar powder and nitrogen simultaneously from the second gas source to the bottom blowing lances at the bottom of the converter;

S4, when the steel scrap is completely melted, stopping the biochar powder blowing, and switching to the lime powder blowing, which comprises sub-steps of:

S41, closing the second cut-off valve and the second regulating valve in sequence, and stopping the biochar powder blowing; continuing blowing nitrogen to the bottom blowing lances at the bottom of the converter by means of the second gas source continues;

S42, opening the third cut-off valve, blowing oxygen from the first gas source to the bottom blowing lances at the bottom of the converter, and simultaneously controlling a flow rate of the nitrogen blown from the second gas source to the bottom blowing lances at the bottom of the converter to gradually decrease, when the nitrogen blowing from the second gas source to the bottom blowing lances at the bottom of the converter is completed, switching to the oxygen blowing from the first gas source to the bottom blowing lances at the bottom of the converter, and closing the fourth cut-off valve; and S43, opening the lime powder silo stamping valve, the first cut-off valve and the first regulating valve, and simultaneously blowing lime powder and oxygen from the first gas source to the bottom blowing lances at the bottom of the converter; and S5, air blowing, which comprises sub-steps of:

closing the first cut-off valve and the first regulating valve, stopping the first gas source from blowing the lime powder to the bottom blowing lances at the bottom of the converter, and continuing blowing oxygen from the first gas source to the bottom blowing lances at the bottom of the converter.

2. The method according to claim 1, wherein a first regulating valve is further arranged between the first injector and the first cut-off valve; and a second regulating valve is also provided between the second injector and the second cut-off valve.

3. The method according to claim 1, wherein a first powder one-way valve is further arranged between the three-way valve and the third cut-off valve;

a second powder one-way valve is also provided between the three-way valve and the fourth cut-off valve.

4. The method according to claim 1, wherein the plurality of bottom blowing lances are arrayed at the bottom of the converter through a distributor, and the distributor is connected with the three-way valve through a rotary joint.

5. The method according to claim 1, wherein in step S1, when nitrogen is blown from the second gas source to the bottom blowing lances at the bottom of the converter, a flow rate of each of the bottom blowing lances is 300 $Nm^3/h$ to 500 $Nm^3/h$.

6. The method according to claim 1, wherein in the step S2, when nitrogen is blown from the second gas source to the bottom blowing lances at the bottom of the converter, a flow rate of each of the bottom blowing lances is 1000 $Nm^3/h$ to 1200 $Nm^3/h$.

7. The method according to claim 1, wherein step S42 specifically comprises controlling a flow rate of the oxygen blown from the first gas source to the bottom blowing lances at the bottom of the converter to gradually increase, while controlling a flow rate of the nitrogen blown from the second gas source to the bottom blowing lances at the bottom of the converter to gradually decrease, so that a total flow rate of the oxygen and the nitrogen through each of the bottom blowing lances is 1000 Nm$^3$/h to 1200 Nm$^3$/h.

8. The method according to claim 1, wherein step S43 specifically comprises: when blowing the lime powder and the oxygen simultaneously from the first gas source to the bottom blowing lances at the bottom of the converter, adjusting an opening degree of the first regulating valve according to a flow rate of the lime powder.

* * * * *